United States Patent [19]

Gosling et al.

[11] 4,060,875
[45] Dec. 6, 1977

[54] APPARATUS FOR CUTTING STUFFED SAUSAGE CASING

[75] Inventors: Lincoln John Gosling, Peterborough; Graham Fraser, Lindsay, both of Canada

[73] Assignee: Union Carbide Canada Limited, Toronto, Canada

[21] Appl. No.: 703,495

[22] Filed: July 8, 1976

[51] Int. Cl.$^2$ ............................................. A22C 11/00
[52] U.S. Cl. ........................................ 17/1 F; 83/278; 17/49
[58] Field of Search ...................... 83/278; 17/1 E, 49

[56] References Cited

U.S. PATENT DOCUMENTS

| 1,819,431 | 8/1931 | McDonald | 83/278 |
| 3,156,006 | 11/1964 | Gouba | 17/1 F |
| 3,194,098 | 7/1965 | Kimball et al. | 83/278 |
| 3,659,316 | 5/1972 | Berendt et al. | 17/1 F |
| 3,716,891 | 2/1973 | Demarest | 17/1 F |

*Primary Examiner*—Donald R. Schran

[57] ABSTRACT

An apparatus and method for cutting stuffed sausage casing into individual lengths in the area of a linkage is described. Chilled casing which is stuffed with sausage meat and linked at predetermined points is guided through the apparatus, a forked blade is positioned over a first linkage and the casing is advanced towards a cutting zone. The forked blade is pivotally mounted on a carriage assembly which is slidably moveable along the direction of the chilled casing. The casing is cut in the area of the linkage by cooperation of a cutting blade with the forked blade in the cutting zone. The carriage assembly is then withdrawn from the cutting zone and the forked blade pivoted forward and upward out of the way of the casing. The forked blade is drawn over the surface of the casing until a second linkage is contacted.

4 Claims, 5 Drawing Figures

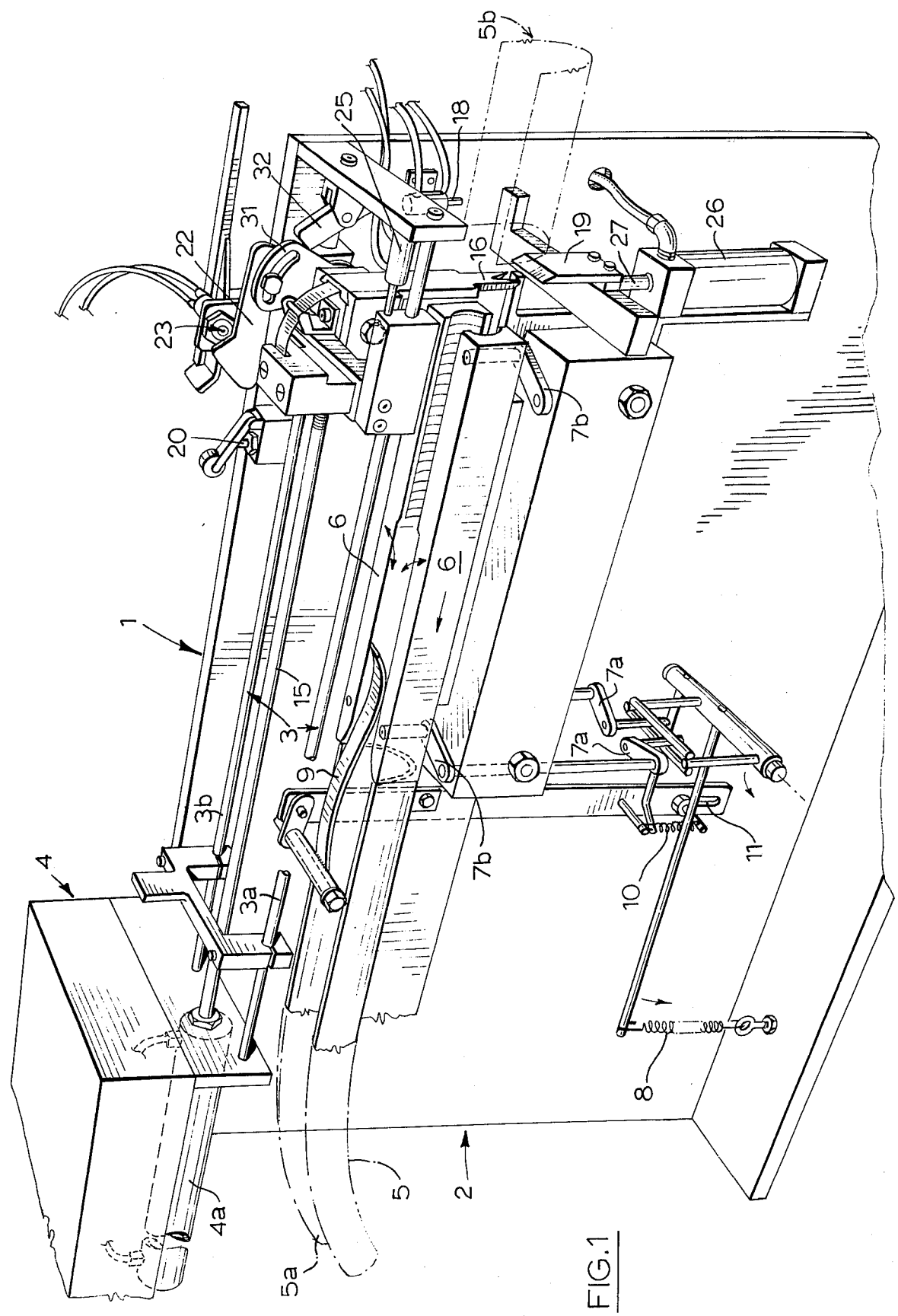

APPARATUS FOR CUTTING STUFFED SAUSAGE CASING

This invention relates to the production of skinless fresh and fresh frozen sausage. More particularly, it relates to an apparatus and method for producing fresh skinless sausage whereby a cellulose casing is stuffed with sausage meat, the casing twist-linked at points along its length to produce a series of individual sausage lengths and the casing subsequently removed from the formed sausage after coagulating a protein skin on the surface of the meat mixture inside the cellulose casing.

This application is particularly concerned with an apparatus and method for cutting the casings at the twist between the links after a chilling stage and immediately prior to removal of the cellulose casing from the individual sausage. It is presently known in the art how to produce skinless sausages by stuffing a sausage meat mixture into a cellulose casing and separating the meat into individual lengths along the casing by twist-linking the casing at various points depending on the length of the sausage desired. Such stuffed and twist-linked lengths of casing are then immersed in a solution of over 2% food grade acid to coagulate the protein on the sausage surface forming a skin and provide a firm sausage structure when the casing is eventually removed. This length of stuffed and twist-linked casing is then passed through a brine solution, the solution being from 2° F to 15° F after washing free of the acid residue where the twist-linked sausage is cooled to the temperature where the sausage is rigid. The chilled, linked sausage is removed from the brine bath after a suitable cooling time, usually 5 minutes or more. The surface of the linked sausage is washed with warm water to defrost the casing to assist in the easy removal of the casing from the sausage meat. The stuffed and twist-linked strand of sausage is then fed into a cutting apparatus whereby the casing is cut between individual sausage lengths at the point of twist-linking and the sausage is passed on to a stripping device whereby the casing is removed and the skinless sausage is passed on to the packing operation.

The applicant has found a novel method and apparatus for cutting the stuffed, twist-linked strands of sausage into individual links which constitute an improvement over the cutting devices presently known in the art. Since the twist-linked casing must be fed into the cutting apparatus at a fairly rapid rate in order to satisfy commercial operations it must be appreciated that any apparatus designed for this purpose must provide a quick, positive cut at the desired point along the length and at the same time permit uninterrupted flow of the casing along its feed path into the cutting and peeling apparatus.

While various attempts have been made in the prior art to provide a commercially practicable cutting apparatus in the production of fresh skinless sausage which would meet this criterion, they frequently call for a relatively expensive and complicated design which is subject to jamming. One such apparatus is described in Canadian Pat. No. 777,084 of William Allen et al wherein a cutting apparatus is described whereby the stuffed casings are cut by the interaction of cooperating cutting knives mounted on cams. When there is even slight stretching of the carrier chains due to temperature changes or mechanical stress, jamming of the apparatus occurs or cutting of the sausage links is made at the wrong point, thereby destroying the sausages.

In the applicant's copending Canadian application Ser. No. 229,986 filed June 24, 1975, an apparatus and method is described whereby a pair of cooperating blades are lifted out of the path of an advancing length of chilled casing stuffed with sausage meat and linked to define individual sausage lengths, by pivoting of the blades upwardly and outwardly by the advancing casing itself. The cooperating blades are returned into the path of the oncoming stuffed casing in an area defined by the linkage between individual sausage lengths and cut the casing by means of the cooperating blades which continue the forward advancement of the individually cut sausage lengths.

The present apparatus and method are directed to improvements whereby the casing is advanced towards a cutting zone by means of a forwardly moving forked blade positioned over a linkage on the casing and then cutting the casing in the area of the linkage by the cooperation of a cutting blade in the cutting zone with the forked blade. Advancement of the length of casing through the apparatus is controlled by the forwardly moving forked blade rather than by a separately operated conveyor guide system. This provides a more controlled sequence of operations and yields greater accuracy in cutting on the linkage area over long production runs.

It is one aspect of this invention to provide a new and improved apparatus for cutting linked stuffed sausage casing in the area of the casing linkage.

It is another aspect of this invention to provide a new and improved method for cutting linked stuffed sausage casing in the area of the casing linkage.

The present invention therefore provides an apparatus for cutting linked stuffed sausage casing into individual lengths in the area of a linkage which apparatus comprises:

a. A passage for guiding a chilled casing to a cutting zone in said apparatus, said chilled casing being stuffed with sausage meat and linked at predetermined points along its length to define individual sausage lengths therebetween;

b. A rail guide positioned above said passage and lateral therewith;

c. A carriage assembly mounted on said rail guide and slidably movable thereon along the direction of said passage said carriage assembly including a forked blade tangentially pivoted thereon with respect to said passage.

d. Means for advancing said carriage assembly along said rail guide towards said cutting zone, said forked blade being positioned in the path of said chilled casing when said blade is pivoted on the fully downward position whereby said forked blade may be wedged over a linkage on said chilled casing and pull said casing towards said cutting zone when said carriage assembly advances towards said cutting zone;

e. Means for withdrawing said carriage assembly from said cutting zone, said forked blade being pivoted forward and upward out of the way of said casing when said carriage assembly is so withdrawn;

f. A cutting blade in said cutting zone and means for raising said cutting blade to cooperate with said forked blade when said carriage assembly is in said cutting zone to thereby cut said chilled casing in the area of said linkage.

The present invention also provides a method for cutting linked stuffed sausage casing into individual lengths in the area of a linkage, which method comprises:

a. guiding a chilled casing along a passage towards a cutting zone, said chilled casing being stuffed with sausage meat and linked at predetermined points along its length to define individual sausage lengths therebetween;

b. positioning a forked blade over a first linkage on said chilled casing and advancing said chilled casing towards said cutting zone by means of said forked blade, said forked blade being pivotally mounted on a carriage assembly slidably moveable along the direction of said chilled casing;

c. cutting said chilled casing in the area of said linkage by the cooperation of a cutting blade with said forked blade in said cutting zone;

d. withdrawing said carriage assembly from said cutting zone and pivoting said forked blade forward and upwards out of the way of said chilled casing and drawing said forked blade over the surface of said casing until a second linkage is contacted by said forked blade.

In the drawings:

FIG. 1 is a general perspective view of the cutting apparatus of the present invention;

Figure 3:
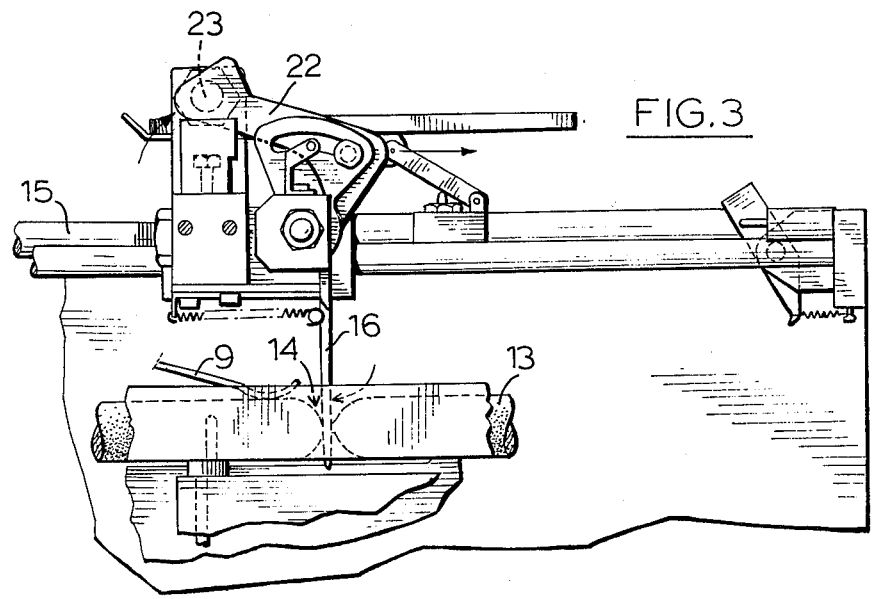
FIG. 3 is a cut-away illustration showing the carriage assembly in the withdrawn position.

The apparatus shown generally as 1 in FIG. 1 includes a support frame 2 which is mounted on rail guide 3 and a pneumatic support system 4 which includes a pneumatic cylinder 4a shown in broken lines for purposes of illustration. A trough 5 is located through the apparatus for directing a length of stuffed casing (not shown) periodically linked along its length from the inlet end 5a to the outlet end 5b.

A set of gripping plates 6 which are spring mounted by means of pivot pins 7a and 7b to move away from each other when the stuffed casing is moving forward towards outlet end 5b to permit freedom of travel for the advancing casing. Should the casing tend to draw back towards inlet end 5a the gripping plates will move towards each other to gently hold the casing in position. The gripper plates 6 are biased to a closed position by the sausage casing and gripper bias spring 8. A hold down tongue 9 is spring biased downwardly by means of spring 10. The hold down tongue 9 is permitted to rise and drop in and out of the depressions on the sausage casing caused by the respective linkages by means of the free motion of lost motion slot 11.

Figure 2:
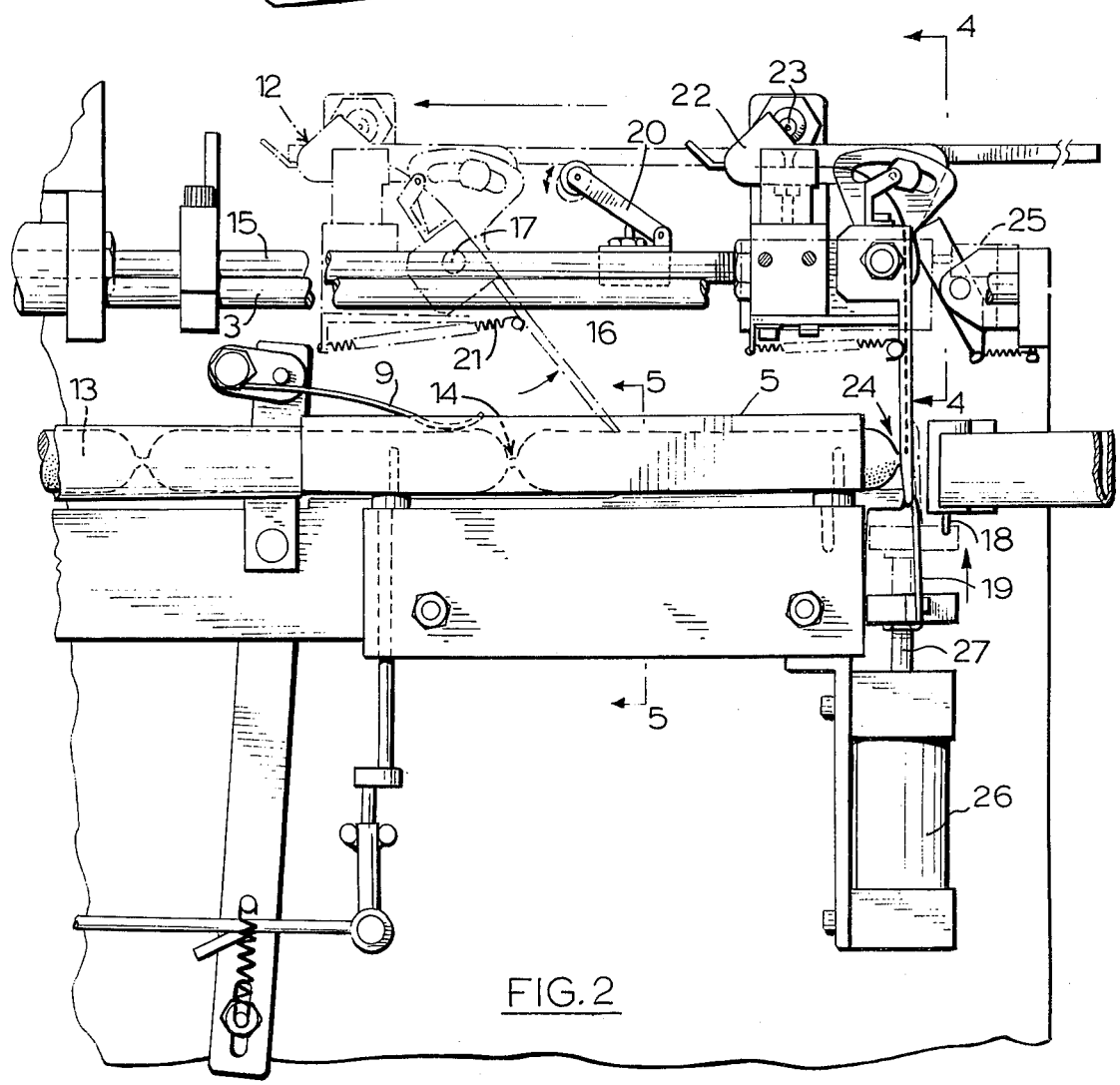
FIG. 2 is a cut-away elevation showing the carriage assembly in the cutting zone and dotted line illustrative of the carriage assembly in the intermediate position.

A carriage assembly 12 is mounted on guide rails 3a, 3b, and 3c being shown in broken construction to more clearly illustrate the features of the apparatus. In FIG. 2 the carriage assembly 12 is shown in the intermediate position along the guide rails in the dotted line configuration. A stuffed casing 13 having periodic linkages 14 is shown positioned in trough 5. The positioning of the carriage assembly 12 along guide rails 3 is controlled by pneumatic cylinder 4a by means of pneumatic piston 15.

Carriage assembly 12 includes a forked blade 16 which is pivotally connected to assembly 12 by pivot pin 17. In the position of the carriage shown in FIG. 1 the carriage is at the end of its forward travel and a cutting operation has been completed. An operating sequence can most easily be described by beginning at that point. A cylinder operating switch 18 is activated by the upward travel of cutting blade 19 in a manner to be explained below or by starting the apparatus manually to commence operations. Activation of switch 18 causes the pneumatic cylinder 4a to draw piston 15 towards the cylinder and thereby draw the carriage assembly 12 towards the inlet end of the apparatus or left hand side as shown in the drawings. As carriage assembly 12 moves to the left it activates travel control switch 20. As the carriage assembly 12 is drawn towards the left forked blade 16 is pushed forward and upward by the stuffed casing and pivoted on the assembly 12 by means of pivot pin 17. The direction of pivoting is illustrated in the dotted line illustration of assembly 12 in FIG. 2 and indicated by the arrow. As the assembly 12 is drawn to the left past switch 20 in the pivoted position it will depress switch 20 which causes the speed of travel of assembly 12 to be slowed considerably. This slowing down is done to permit the forked blade 16 to more easily detect a depression caused by a linkage 14.

When a linkage 14 is detected, the forked blade 16 drops into position on the linkage by the force of carriage assembly spring 21. A cam plate 22 on assembly 12 is tilted forward by the downward dropping of forked blade 16 and closes off pneumatic cylinder switch 23. The closing of this switch by the cam plate 22 is best seen in FIG. 3 where the switch is shown in broken lines. When switch 23 is closed pneumatic cylinder 4a pushes piston 15 forward again to advance the carriage assembly 12 to the right in the direction of the arrow shown in FIG. 3. As the carriage assembly 12 advances, the forked blade 16 which is wedged with linkage 14 pulls the length of stuffed casing along with it. It might be noted that unlike some sausage cutting apparatus of the prior art the present apparatus does not provide a separate mechanical means for advancing the length of stuffed casing. The casing is advanced by being pulled along periodically by the advancing carriage assembly 12.

Should the length of stuffed casing tend to draw itself back towards the left or inlet end of the apparatus due to the force of its own weight or other causes when it is not being held by forked blade 16, the gripping plates 6 will tend to draw together to gently grip the casing and hold it in position. As can be seen in FIG. 1, gripping plates 6 are slightly levelled at the forward end beyond the directional arrows to provide a more restricted passage for the casing. The gentle spring action on pivot pins 7a and 7b still permit free forward movement of the casing when it is being pulled forward by the carriage assembly 12 but the notched walls 6a of the gripping plates 6 tend to draw the plates together when the casing is moved towards the inlet end of the apparatus.

Returning to the description with particular reference to FIGS. 2 and 3, it can be noted that as the carriage assembly 12 advances to the right from the position shown in FIG. 3 it travels to the end of guide rails 3a and 3b until it reaches the position shown in solid lines in FIG. 2. The forked blade pulls the length of sausage casing along with it until when the carriage assembly 12 is at the forward right hand position, the forked blade 16 has pulled the casing until linkage 14 is positioned on the cutting zone 24. When carriage assembly 12 reaches the right hand end of the guide rails 3a and 3b it activates cutting switch 25 which operates blade pneumatic cylinder 26 and causes the cylinder to advance blade piston 27. The advancement of piston 27 raises cutting blade 19 into the cutting zone 24 where it cooperates with forked blade 16 to cut the casing in the area of linkage 14. When blade 19 reaches its cutting position, blade piston 17 impurges on air cylinder operating switch 18 which signals for the withdrawal of carriage assembly 12 to the left hand side. As carriage assembly 12 moves to the left it releases switch 25 which causes cutting blade 19 to drop back down out of the cutting zone. It must be pointed out that when carriage assembly 12 enters the cutting zone, slotted plate 31 of cam plate assembly 22 impurges on stop plate 32 thereby moving cam plate assembly backwards to open switch 23 as shown in FIG. 1. If switch 23 is not opened the carriage assembly 22 will not be able to move backward when switch 18 is activated. The sausage casing to the right of the cutting area is now a single sausage length still enveloped in its casing. This sausage length is then discharged from the outlet end 5b of the apparatus where the casing is removed and the sausage length handled in a manner well known in the art and not of concern for the purpose of describing the present apparatus.

Figure 4:
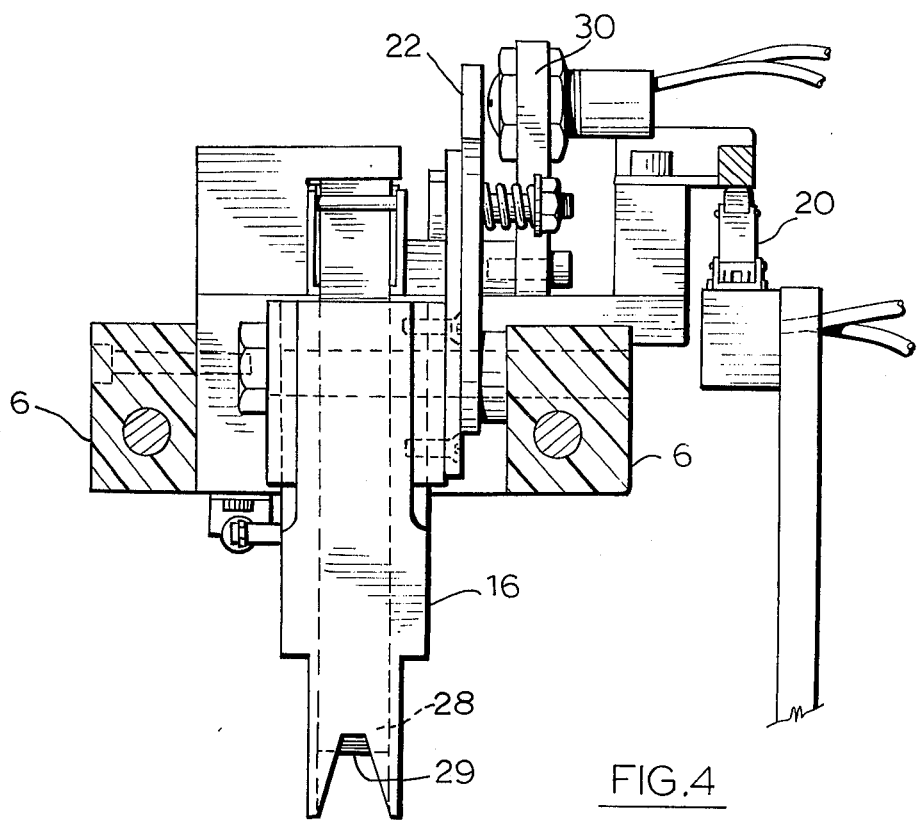
FIG. 4 is a view along line 4—4 of FIG. 2 particularly illustrating the gripping plates, forked blade and blade, skirt.

As the carriage assembly 12 moves to the left, the forked blade 16 is pivoted upward and away from the stuffed sausage casing by the presence of the casing itself. The blade gently rests on the upper surface of the casing as it is drawn towards the position shown in broken lines in FIG. 2. In order to avoid the danger of damaging the casing when the forked blade 16 is drawn back over it, the carriage assembly 12 is equipped with a blade skirt 28 which is shown in FIG. 1 and in broken lines in FIG. 4. Blade skirt 28 is a plastic strip that is fixed to carriage assembly 12 at its upper end and runs longitudinally along forked blade 16 on the side which rests on the upper surface of the casing. When blade 16 is in the downward position on a linkage area of the casing the leading edge 29 of blade skirt 28 extends below the forked blade so that as the carriage assembly 12 travels to the left and the blade 16 rides over the stuffed casing, the blade skirt 28 contacts the casing instead of the forked blade 16. In FIG. 4, the forked blade is shown in front view with the blade skirt 28 illustrated in broken lines. When the blade is in the downward position over a linkage in the casing, the leading edge 29 is just slightly below the base of the fork formation. When the blade is pivoted, the blade skirt 28 extends to the tips of the forked blade as indicated by the broken lines. FIG. 4 also shows the cam plate assembly 22 which is geared to support bracket 30 for mounting switch 23. Cam plate assembly 22 includes a slotted plate 31 (FIG. 1) to allow an area of free play in the pivoting of the forked blade 16 before the cam assembly is moved up to cut off switch 23.

Figure 5:
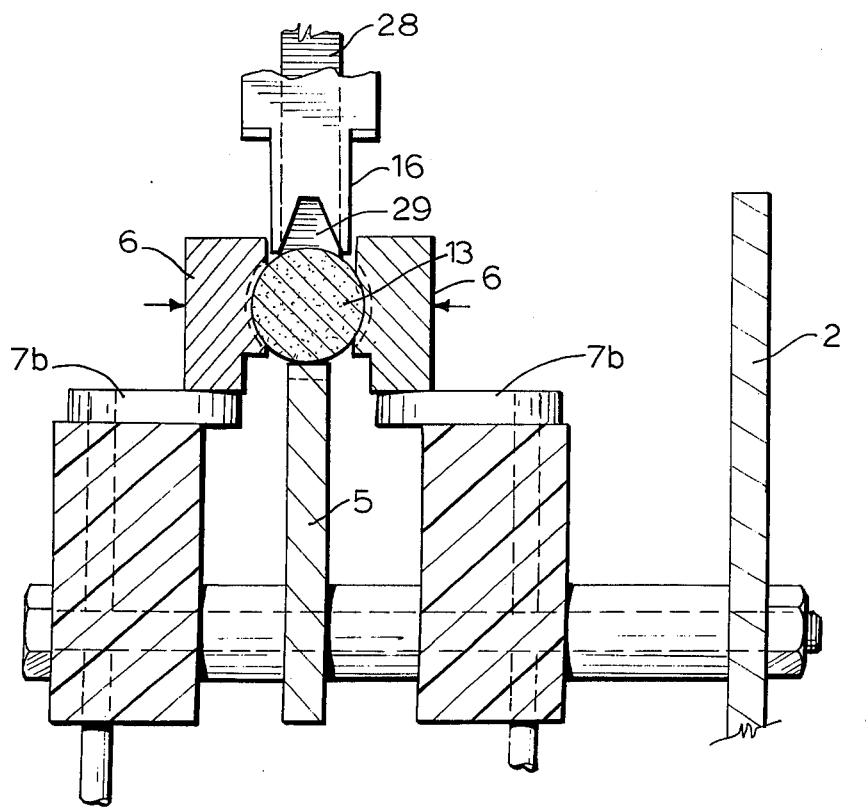
FIG. 5 is a view along line 5—5 of FIG. 2 particularly illustrating the gripping plates, pivot pins and forked blade in relation to the stuffed casing.

In FIG. 5 the operation of gripping plates is particularly illustrated. In the drawing, stuffed casing 13 is shown as travelling in the direction towards us. When forked blade 16 is in the downward position in a linkage and pulling the length of casing forward, the gripping plates 6 are opened and their inner walls are in the position illustrated by the broken lines. The trough 5 is shown in simplified form since at this point the length of casing is guided by the gripping plates, like forked blade and the hold down tongue (FIG. 1). When the forked blade is pivoted upward and outward as illustrated in FIG. 5, the leading edge 29 of blade skirt 28 extends down to the tips of the fork points. Since it is important that the length of casing be held during this stage, the walls of the gripping plates 6 come together by the action of pivot pins 7b to connect with the surface of the casing, as shown in the solid line for the gripping plate walls in the drawing.

Considering now the operation of the apparatus for cutting (a length) of stuffed casing into individual lengths of sausage, a length of stuffed casing is passed into the apparatus at the trough inlet end 5a from a brine tank. The stuffed casing has been twist-linked periodically along its length to define individual sausage lengths between the linkages. In order to start the operation the length of casing must be fed through trough 5 to a point where the leading end of the casing extends to the cutting zone and the carriage assembly extends to the right as shown in FIG. 1 with the forked blade 16 positioned immediately ahead of the casing. When the apparatus is switched on, the cylinder 4a draws carriage assembly 12 to the left. As the carriage assembly draws back, the forked blade 16 is pivoted upwardly and outwardly out of the way of the stuffed casing 13 and rides on top of the casing as shown in the broken line illustration of the carriage assembly in FIG. 2. When the forked blade 16 is in the overriding position, the blade skirt 28 extends down below the blade points to protect the surface of the casing in a manner as illustrated in FIG. 4. While the carriage assembly 12 is drawing back to the left, the length of stuffed casing 13 is held in place by the coming together of gripping plates 6 in the manner previously described. Since the present apparatus is designed to permit the forked blade to override the casing and drop between the linkages, it can accommodate a sausage casing having some random variations in width and individual sausage length. This is important in production where there is a degree of variation in the stuffed casing produced.

When the carriage assembly proceeds to the left after having been slowed down by the action of travel control switch 20, the forked blade 16 eventually reaches another linkage in the casing. The blade is pivoted down into position on the linkage in the manner shown in FIG. 3 and in this position blade skirt 28 is left out of the way of the edges of forked blade 16. As the blade pivots forward, pneumatic cylinder switch 23 is activated by means of cam plate assembly 22 which sequels the carriage assembly to move forward to the right and bring the linkage into the cutting zone. When carriage assembly 13 reaches the cutting zone it impurges upon and activates cutting switch 25 which causes cutting blade 19 to rise and cooperate with forked blade 16 to cut the casing at the linkage.

When cutting blade 19 is in the raised position it activates switch 20 which in turn sequels pneumatic cylinder 4a to withdraw carriage assembly 12 to the left. As the carriage assembly moves to the left it releases switch 25 to cause the cutting blade 19 to drop downwards out of the cutting zone. As the carriage assembly 12 is withdrawn, forked blade 16 is pivoted upwardly and outwardly out of the way of the casing. The series of steps may be repeated throughout the length of the casing as the sequence of steps is determined by the location of a linkage in the casing during the leftward travel of the carriage assembly. The backstop 3c shown in FIGS. 1 and 2 limits the leftward travel of the carriage assembly and deflects the carriage assembly forward by means of the vertical extension 3d, thereby dropping the forked blade into the cutting position and causing the carriage assembly to move forward. This is required in order to continue the operation of the apparatus should the casing fail to have a linkage at one point due to variations in the stuffed casing production.

The cut sausage length of stuffed casing is discharged through the outlet end 5b of the apparatus where it may be sprayed with warm water to partially defrost the casing and then passed to a means for peeling the casing from the sausage length.

We claim:

1. An apparatus for cutting linked stuffed sausage casing into individual lengths in the area of a linkage, which apparatus comprises:
    a. a passage for guiding a chilled casing to a cutting zone in said apparatus, said chilled casing being stuffed with sausage meat and linked at predetermined points along its length to define individual sausage lengths therebetween;
    b. a rail guide positioned above said passage and lateral herewith;
    c. a carriage assembly mounted on said rail guide and slidably moveable thereon along the direction of said passage, said carriage assembly including a forked blade tangentially pivoted thereon with respect to said passage;
    d. means for advancing said carriage assembly along said rail guide towards said cutting zone, said forked blade being positioned in the path of said chilled casing when said blade is pivoted in the fully downward position whereby said forked blade may be wedged over a linkage on said chilled casing and pull said casing towards said cutting zone when said carriage assembly advances towards said cutting zone;
    e. means for withdrawing said carriage assembly from said cutting zone, said forked blade being pivoted forward and upward out of the way of said casing when said carriage assembly is so withdrawn;
    f. a cutting blade in said cutting zone and means for raising said cutting blade to cooperate with said forked blade when said carriage assembly is in said cutting zone to thereby cut said chilled casing in the area of said linkage.

2. An apparatus as claimed in claim 1 wherein said carriage assembly includes a blade skirt slidably positioned longitudinally along the axis of said forked blade, the leading edge of said blade skirt extending beyond the edge of said blade when said blade is pivoted forward and upward.

3. An apparatus as claimed in claim 2 wherein said passage includes a pair of gripping plate on defining a portion of said passage and being inwardly pivoted away from said cutting zone whereby said gripping plate may grip said chilled casing when said carriage assembly is being withdrawn from said cutting zone.

4. A method for cutting linked stuffed sausage casing into individual lengths in the area of a linkage, which method comprises:
    a. guiding a chilled casing along a passage towards a cutting zone, said chilled casing being stuffed with sausage meat and linked at predetermined points along its length to define individual sausage lengths therebetween;
    b. positioning a forked blade over a first linkage on said chilled casing and advancing said chilled casing towards said cutting zone by means of said forked blade, said forked blade being pivotally mounted on a carriage assembly slidably moveable along the direction of said chilled casing;
    c. cutting said chilled casing in the area of said linkage by the cooperation of a cutting blade with said forked blade in said cutting zone.
    d. withdrawing said carriage assembly from said cutting zone and pivoting said forked blade forward and upwards out of the way of said chilled casing and drawing said forked blade over the surface of said casing until a second linkage is contacted by said forked blade.

* * * * *